B. AIKMAN.
FLUID PRESSURE SYSTEM.
APPLICATION FILED MAY 27, 1907.

902,637.

Patented Nov. 3, 1908.
2 SHEETS—SHEET 1.

Witnesses:
Leonard W. Novander,
Fred W. Koehn,

Inventor
Bert Aikman
By Charles A. Brown
Attorney

B. AIKMAN.
FLUID PRESSURE SYSTEM.
APPLICATION FILED MAY 27, 1907.

902,637.

Patented Nov. 3, 1908.
2 SHEETS—SHEET 2.

Witnesses:
Leonard W. Novander.
Fred W. Koehn.

Inventor
Bert Aikman
By Charles A. Brown
Attorney

UNITED STATES PATENT OFFICE.

BERT AIKMAN, OF CHICAGO, ILLINOIS, ASSIGNOR TO NATIONAL BRAKE & ELECTRIC COMPANY, OF MILWAUKEE, WISCONSIN, A CORPORATION OF WISCONSIN.

FLUID-PRESSURE SYSTEM.

No. 902,637.　　　　Specification of Letters Patent.　　　　Patented Nov. 3, 1908.

Application filed May 27, 1907. Serial No. 375,831.

*To all whom it may concern:*

Be it known that I, BERT AIKMAN, citizen of the United States, residing at Chicago, in the county of Cook and State of Illinois, have invented a certain new and useful Improvement in Fluid-Pressure Systems, of which the following is a full, clear, concise, and exact description, reference being had to the accompanying drawings, forming a part of this specification.

My invention relates to motor compressor systems, its object being to provide more efficient arrangement and operation.

My system belongs to that class in which a compressor for supplying the reservoir is driven by an electric motor with which is associated resistance which is gradually cut out of circuit when the motor is started and in which valves of the compressor are incapacitated until the motor has obtained full speed or a speed which it can best take on a load. In some of these prior systems the valves of the compressor, as, for instance, the suction valves were controlled to render the compressor inactive until the motor assumed a suitable speed, and these valves have generally been controlled by electrical means, solenoids being usually employed to operate the valves. Electrical controlling mechanism is also used for gradually rendering the motor resistance ineffective to cause gradual start of the motor. This electrical control involved the use of a great many electrical circuits, windings, and more or less delicate mechanism which made the system more or less expensive of construction, and this electrical control furthermore is more or less unreliable, as the windings are easily burned out and the delicate mechanism unbalanced and injured, the cost of maintenance being, therefore, very considerable. Again, the use of electric current for operating these electrical mechanisms involved further expense.

My improved system is entirely devoid of electrical controlling mechanisms, the entire control being effected by pneumatic means. This makes it possible to build stronger controlling mechanism and more simple mechanism, thus greatly reducing the cost of construction and maintenance and also further increasing the efficiency by reason of the more certain and reliable operation of compressed air over electrical operation.

Figure 1:
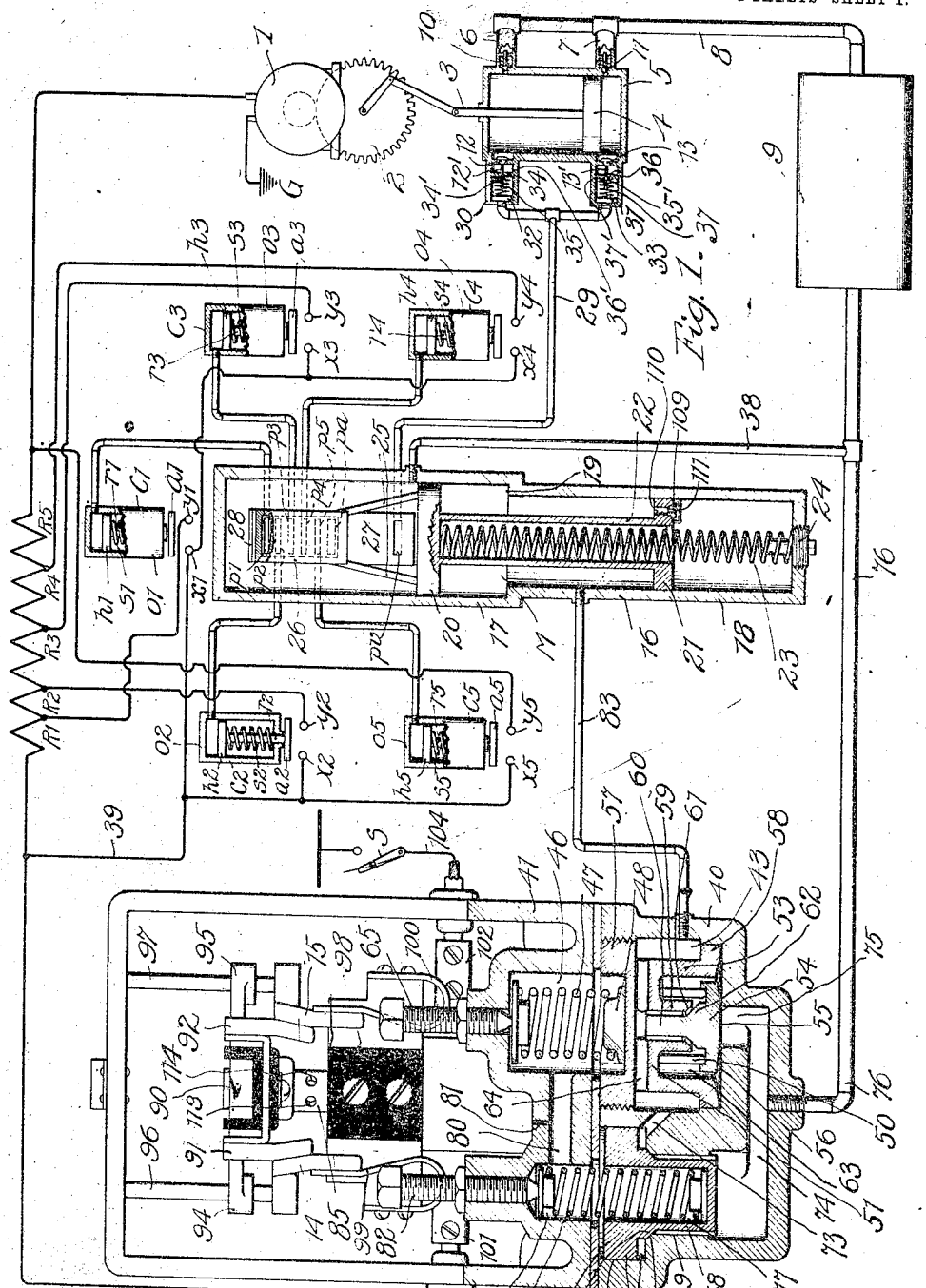
Figure 2:
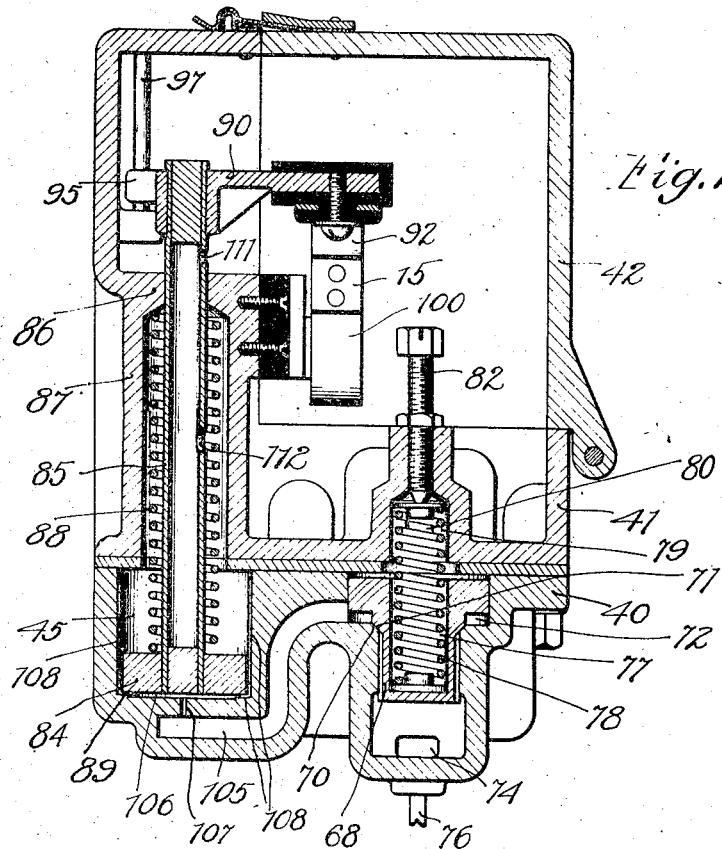
Figure 3:
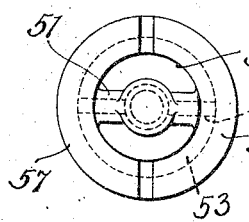
Figure 4:
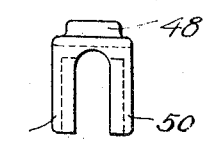
Figure 5:
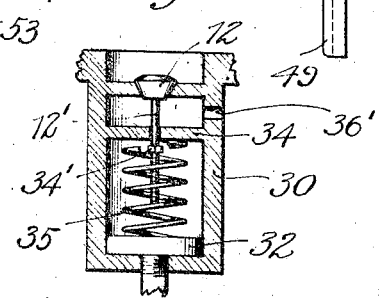

My invention will be best understood when described by reference to the accompanying drawings, in which Figure 1 shows a complete system, the operative parts for controlling the motor being shown more or less diagrammatically and the pneumatic governor being shown in vertical section; Fig. 2 shows another vertical section of the pneumatic governor; Fig. 3 is a top view of the low pressure valve frame; Fig. 4 is an elevation view of the low pressure spring thimble, and Fig. 5 is an enlarged view showing an arrangement of the suction valve controlling mechanism.

In the system as shown, the electric motor 1 is coupled through suitable gearing mechanism 2 to the piston rod 3 terminating in the piston head 4 within the compressor cylinder 5. Pipes 6 and 7 lead from the ends of the compressor cylinder and into a main pipe 8 which feeds to the reservoir 9, the flow through pipes 6 and 7 being controlled as by check valves 10, 11. Suction valves 12 and 13 are also shown through which air is supplied to the compressor. One terminal of the motor is shown as connected to ground G, while the other terminal connects normally through resistance sections $R^1$, $R^2$, $R^3$, $R^4$ and $R^5$ with the switch contact 14 of the pneumatic governor, the associated switch contact 15 being connected with line through a main switch S.

The motor controlling apparatus comprises a main cylinder piston outfit M and a plurality of sub-cylinder piston outfits $C^1$, $C^2$, $C^3$, $C^4$ and $C^5$, equal in number to the resistance sections. The main cylinder piston outfit comprises the cylindrical inclosing shell 16 whose upper part 17 is of greater diameter than the lower part 18 to provide a ledge 19. Adapted to reciprocate in the upper part is a piston 20, and adapted to reciprocate in the lower part is a piston 21, these pistons being united by the cylindrical shell 22. Within this shell is pocketed a spring 23 which abuts against the piston 20 and the abutment stop 24 threaded into the lower wall of the cylinder frame. Extending upwardly from the upper piston are the arms 25 carrying the D valve 26 which rests on the valve seat 27, the normal position of the parts mentioned being as shown, the compression spring holding the piston frames up with the valve against the stop 28 at the upper end of the valve seat. Leading from the upper end of the valve seat are the ports $p^1$, $p^2$, $p^3$, $p^4$ and $p^5$ connected, respectively, with the sub-cylinder piston outfits $C^1$, $C^2$, $C^3$, $C^4$ and $C^5$ as shown. The port $pa$ also leads from the valve seat to atmosphere, and the port $pv$ leads through pipe 29 to the cylinders 30 and 31. In the cylinder 30 is a piston 32, while in the cylinder 31 is a piston 33. Between the piston 32 and the intermediate wall 34 in cylinder 30 is the compression spring 35, while in cylinder 31 between the piston 33 and the intermediate wall 36 is a compression spring 37. The stems 12′, 13′ extend from suction valves 12, 13, respectively, and through the walls 34 and 36 to be engaged by pistons 32 and 33 when the pressure reaches a certain point. Collars 34′ and 35′ on the stems limit the movement of the valves. Openings 36′ and 37′ in cylinders 30 and 31 communicate with the suction valve chambers. A pipe 38 connects the upper compartment 17 of the main cylinder with the reservoir.

Cylinder piston outfit $C^1$ comprises the cylinder $o^1$ and the piston $h^1$. The piston rod $r^1$ terminates in a contact arm $a^1$ adapted when the piston is moved out to connect together contacts $x^1$, $y^1$, which contacts are bridged about the resistance section $R^1$. Between the piston $h^1$ and the cylinder head is a compression spring $s^1$.

Cylinder piston outfits $C^2$, $C^3$, $C^4$ and $C^5$ have the same parts as outfit $C^1$, but the reference characters are given subscripts 2, 3, 4 and 5, respectively. The contacts $x^2$, $x^3$, $x^4$ and $x^5$ are all connected in common with the entrance terminal of the resistance through conductor 39. Contact $y^1$, as before stated, is connected with the end of resistance section $R^1$. Terminal $y^2$ connects with the end of resistance section $R^2$; contact $y^3$ connects with the end of resistance section $R^3$; contact $y^4$ connects with the end of resistance section $R^4$, and contact $y^5$ connects directly with the motor terminal. In the normal position the sub-cylinders are connected with atmosphere through their respective port openings through the D valve and through atmosphere port $pa$. When the piston frame within the main cylinder is driven downwardly, port $p^1$ is first disconnected from atmosphere and exposed to receive air under pressure fed to the main cylinder from the reservoir through pipe 38, and outfit $C^1$ is actuated to close contacts $x^1$, $y^1$, thereby short-circuiting resistance section $R^1$. Port $p^2$ is next exposed, and outfit $C^2$ is actuated to short circuit resistance section $R^2$, and so on ports $p^3$, $p^4$ and $p^5$ are successively exposed, to successively short-circuit sections $R^3$, $R^4$ and $R^5$, when the entire resistance will be rendered ineffective and the motor connected directly with the pneumatic governor switch contact 14.

The distance between atmospheric port $pa$ and port $pv$ is such that after the ports $p^1$ to $p^5$ have been successively exposed, the D valve will span the ports $pa$, $pv$ in order to connect the suction valve cylinders 30 and 31 with atmosphere. The springs 35 and 37 in the suction valve cylinders are adjusted to, say, about twenty pounds so that they will not allow movement of the pistons 32 and 33 to influence the suction valves until the pressure on the pistons approaches twenty pounds per square inch. The spring 23 for the main piston frame has a comparative adjustment of about five pounds,—that is, it will start to move when the pressure becomes about five pounds per square inch and so that the upper piston 20 will reach the ledge 19 when the pressure gets to be about eight or ten pounds. With this arrangement, when the motor is started with the pressure in the reservoir at zero, for instance, the suction valves of the compressor will be operative and air will be compressed in the reservoir and this compressed air reaches the cylinder above the piston 20 through pipe 38. The piston frame is moved downwardly and the valve carried therewith to gradually expose the port openings to the pressure, and the piston 20 will reach the bottom of its stroke before the pressure will have any effect on the suction valve springs and, therefore, the compressor action will not be affected, but, as before stated, when the valve reaches its lower position, the ports $pv$ and $pa$ are connected together which means that the cylinders 30 and 31 are connected with atmosphere and the suction valves are then entirely free from the effects of pressure and the motor can operate the compressor in a normal manner.

I shall now describe the pneumatic governor mechanism for controlling the operation of the main piston frame when a certain maximum and minimum pressure are reached in the pressure system. In general, the operation is such that the lower compartment 18 of the main piston outfit is connected with atmosphere when the pressure reaches minimum or is below minimum, and connected with the reservoir when the pressure reaches maximum, the pressure being equalized to the reservoir pressure at both sides of the piston 20. Spring 23, of course, will become effective to raise the piston frame and to gradually reinclude the resistance sections in circuit to gradually reduce the speed of the motor, the operation of the pneumatic governor being such that when this resistance is reincluded in circuit, the feed line to the motor will be broken at contacts 14 and 15.

As I do not desire to claim the mechanical construction and arrangement of the pneumatic governor mechanism, I have shown just enough thereof to illustrate the operation of the parts and the operation in connection with the remainder of the system.

The governor comprises the base part 40, the sub-base part 41 and the cover 42. In Fig. 1 the governor is shown in section taken on a vertical plane passing through the line connecting the centers of the low pressure valve compartment 43 and the high pressure valve compartment 44, while in Fig. 2 the governor is shown in sectional view taken on a vertical plane passing through the line connecting the centers of the high pressure valve compartment 44 and the contact mechanism piston compartment 45. These valve compartments are all in the base part 40. In the sub-base part 41 is the pocket 46 for receiving the compression spring 47 whose lower end engages the top of the thimble 48 whose shape is best shown in Fig. 4. This thimble has the legs 49 and 50 which straddle over the cross bar 51 extending across the central opening 52 of the cylindrical low pressure valve frame 53, the diameter of the cylindrical thimble being less than the diameter of this opening. The legs 49 and 50 engage the valve button 54 which engages the diaphragm 55 supported on the ledge 56 forming the floor of the valve chamber 43. The low pressure valve frame 53 has the upper flange 57, shown as screw-threaded into the upper end of the valve compartment 43, and the lower end 58 of the valve frame bears against the diaphragm to clamp the edge of the diaphragm to the ledge 56. Extending downwardly from the center of the cross bar 51 is the hub 59 forming a guideway for the valve stem 60 extending from the valve button 54, and the lower inner edge 61 of the hub is beveled to form a valve seat for the conical part 62 between the valve stem and the button. The adjustment is such that when the diaphragm is normally held down by the force of the spring 47, the valve cone will be away from the seat to allow communication between the valve chamber 63 and the passageway 64 extending diametrically across the valve frame 53 through the cross bar 51, this passageway communicating at its ends with the compartment 43. When the diaphragm is up, the valve cone will engage the seat 61, and communication between chambers 43 and 63 will be closed. The spring 47 is of such dimension that it will allow the diaphragm to raise when the pressure reaches the determined minimum value which in practice may be about sixty pounds. An adjusting screw 65 is shown for adjusting the action of the spring 47.

The high pressure valve 66 has the piston head 67 reciprocal within the compartment 44. The stem 68 of the valve engages in the valve channel 69, and the upper edge 70 of this channel is beveled to form a valve seat to be engaged by the conical section 71 on the valve stem. The diameter of the valve stem is slightly less than that of the channel so that the normal actuation surface of the valve is equal to the sectional area of the space between the valve stem and channel. The lower part of the head 67 is also cut away at the base of the conical part 71 to allow for the annular chamber 72, this annular chamber being connected with the compartment 43 of the low pressure valve through the passageway 73. A passageway 74 connects the valve channel 69 with the compartment 75 below the diaphragm, and this passageway communicates through pipe 76 with the reservoir. The valve stem is hollow to form a pocket 77 for receiving the lower end of compression spring 78 whose upper end extends into the pocket 79 cast in the sub-base part 41. This spring which normally holds the high pressure valve upon its seat, is adjusted to respond only when the pressure reaches the maximum value. Connecting the pockets 79 and 46 is the passageway 80 which passageway connects with atmosphere through the port 81 which is of comparatively small diameter. A screw 82 is shown by means of which the adjustment of the spring 78 may be varied. The compartment 43 for the low pressure valve mechanism connects through pipe 83 with the main cylinder 16 at a point below the piston 20.

In the piston compartment 45 is the piston 84 from which extends the tubular piston rod 85 guided at its upper end by the flange 86 at the upper end of the shell or frame 87 through which the piston passes, this shell forming part of the sub-base 41. Within this shell 87 and the piston compartment is the compression spring 88 abutting against the piston and the flange 86, this spring serving normally to hold the piston down against its annular seat 89. Secured to the upper end of the tubular piston rod is the contact frame 90 which at its front end carries contacts 91 and 92 connected by conductor 93. Extending rearwardly from the contact frame are the guide bearings 94, 95 engaging the guide-rods 96 and 97 suitably supported from the sub-base frame. As the piston 84 is raised, the contact frame is also raised to disconnect contacts 91, 92 from contacts 14 and 15, and when the piston is returned, the contacts are again brought into engagement with contacts 14 and 15, as best shown in Fig. 1. Contacts 14 and 15 are supported from the base 98 and suitably insulated therefrom, as shown in Fig. 2, conductor bars 99 and 100 connecting these contacts with the terminal lugs 101, 102 with which the motor lead 103 and line lead 104 are connected. A passageway 105 connects the high pressure piston compartment 44 with the compartment 106 formed below the piston 84 when the piston is down, the connection being through a restricted port opening 107. The sides of the piston chamber 45 and the seat 89 are also slotted to form by-passes 108. Through the wall of the piston 85 is an inlet opening 109 and at the upper end thereof opposite the engaging ends of the contact members are the outlet openings 110, 111 arranged to direct compressed air to blow out arcs formed upon disengagement of the contacts.

To illustrate the operation of my system, suppose that the reservoir is empty, that is, at zero pressure, and suppose it is desired to bring the system into working order. The switch S is closed and the automatic governor switch being normally closed, current will flow from the line through conductor 104, through contacts 15, 92, 91, 14, conductor 103 thereof, the resistance sections $R^1$ to $R^5$ and through the motor to ground. There being no pressure in the suction valve cylinders 30 and 31, the compressor is free to operate and air is immediately compressed into the reservoir, and this pressure is distributed from the main reservoir through the pipe 76 to the passageway 74 under the high and low pressure valves and also to the main piston cylinder above the piston 20 through the pipe 38. The springs of the low and high pressure valves, however, are adjusted at, say, sixty and eighty pounds, respectively, and the suction valve springs at twenty pounds and will not be affected immediately. The main piston spring 23, however, is of low adjustment, as already mentioned, and will start to move when the pressure gets to be about five pounds to the square inch, and when the pressure has reached, say, about eight or ten pounds to the square inch, the piston 20 will be in its lowermost position against the ledge 19. The compartment below the piston 20, as is understood, is normally connected with atmosphere through pipe 83, compartment 43, passageway 64, compartment 63, passageway 80 and through port 81. The piston 20 will, therefore, reach its lowermost position before the pressure becomes high enough to affect the operation of the suction valves in the compressor and during the downward movement of the D valve 26 which is carried with the piston, as already described, the various sub-contact outfits $C^1$ to $C^5$ will be successively connected with the reservoir to successively cut out of circuit the resistance sections $R^1$ to $R^5$ to thus gradually connect the motor directly with the line. Also, as has already been described, the D valve at the end of its stroke connects pipe port $pr$ with atmospheric port $pa$, and thus the suction valve cylinders 30, 31 are connected with atmosphere and the operation of the suction valves is absolutely unhindered by any air pressure, and the motor can continue driving the compressor at its full capacity to quickly bring the pressure in the reservoir up to normal. As soon as the pressure reaches the minimum pressure value which has been assumed as sixty pounds, the diaphragm 55 supporting the low pressure valve button will be raised to carry the conical part 62 of the valve against the valve seat 61, thus to close communication between passageway 64 and compartment 46 connected with atmosphere through passageway 80 and port 81. This means that the main cylinder below the piston 20 is disconnected from atmosphere as well as compartment 106 below the contact piston 84 and compartment 72 under the high pressure valve piston 67, this compartment 72 being connected with passageway 64 through port 73 and compartment 106 being connected with compartment 72 through port 107 and passageway 105, as shown in Fig. 2. Now when the pressure reaches the maximum pressure value or eighty pounds, the high pressure valve will be raised to allow connection between passageway 74 and compartment 43 through the compartment 72 and port 73, and the reservoir, therefore, will be connected with the chamber below the main piston 20 and also with compartment 106 below the contact piston by way of passageway 105 and port 107. Owing to the by-pass about piston 84 and the restricted diameter of the port 107, the operation of the piston 84 will be gradual. The pressure at both sides of piston 20 being suddenly equalized, spring 23 becomes effective to restore the piston and the D valve carried thereby to their normal position. The movements of this piston frame are also more or less gradual on account of a check valve 109 carried by lower piston 21, which valve when off its seat exposes large by-pass 110 through the piston, but which when on its seat restricts the by-pass to the small opening 111 through the valve, the bottom of the cylinder being filled with oil. The upward movement of the piston frame is therefore more rapid than the downward movement.

The first effect upon upward movement of the D valve will be to disconnect port $pv$ from atmosphere and to release this port so that air under reservoir pressure may enter through pipe 29 into suction valve cylinders 30 and 31 to raise pistons 32 and 33 against the pressure of springs 35 and 37 and against the valve stems, thereby raising the suction valves off their seats to incapacitate the compressor. Upon further upward movement of the D valve to its normal position, the controlling outfits $C^5$, $C^4$, $C^3$, $C^2$ and $C^1$ are successively disconnected from reservoir pressure and connected with atmosphere so that their pistons are restored and their contacts disconnected to cause the resistance sections $R^5$, $R^4$, $R^3$, $R^2$ and $R^1$ to be successively reincluded in the motor circuit, and the motor thus gradually slowed down. By the time this has been accomplished, sufficient pressure will have passed through port 107 and against the piston 94 to throw this piston upwardly against the pressure of the spring 88 (which is adjusted to about twenty-five pounds), and contacts 91, 92 will be disengaged and contacts 14 and 15 will break the motor circuit. Compressed air may enter through by-passes 108 to the compartments above the piston and into the hollow piston rod opening 112 and from thence outwardly through openings 113 and 114 to blow out any arcs which might occur as the contacts are disconnected. When the piston 84 reaches the top of its stroke, connection between by-passes 108 and the interior of the piston rod will be shut off. Thus, the motor and the compressor are gradually started and gradually disconnected.

As has been explained, valve 66 at the start offers a restricted area. As soon, however, as it leaves its seat under eighty pounds pressure, a much greater surface is offered and much less pressure (about forty) is requisite to complete its movement and to hold it, and therefore as long as the pressure remains above the minimum value, the above condition of affairs will be maintained, but if the pressure should drop below sixty pounds, spring 47 becomes effective to push the low pressure valve downwardly to again establish communication between compartments 43 and 63, thereby reconnecting the compartment below the main piston 20 with atmosphere and also connecting with reservoir the compartment 79 above the high pressure valve piston 67, and the pressure becoming thus equalized at both sides of the high pressure valve, this valve is returned to normal by spring 78. The restricted by-pass 81 will not hinder this equalizing operation. When valve 66 reseats the compartment below piston 84 is disconnected from reservoir and reconnected with atmosphere through compartment 72, port 73, valve 62 and port 81. Spring 88 becomes effective to restore piston 84 to its lower position and to carry contacts 91 and 92 again into engagement with contacts 14 and 15 to close the motor circuit. As soon as piston 84 starts to move downwardly, by-passes 108 become effective and assist the port 81 in giving quick relief to atmosphere so that the contacts are quickly brought into engagement. Partly on account of port 81 which is of restricted diameter and which offers the only outlet to atmosphere from below the main piston 20, and partly on account of the restricted by-pass in piston 21, the downward movement of this piston is retarded, there being no response of the resistance-controlling outfits $C^1$ to $C^5$ until the governor contacts have been closed, and then these resistance adjusting outfits are successively connected into service to successively render the resistance sections $R^1$ to $R^5$ ineffective. The pressure in the reservoir being at minimum pressure value or at about sixty pounds as assumed, the suction valve springs will remain overcome and the suction valves maintained ineffective and the motor thus starts under no load conditions. After the motor is fully connected in circuit, the D valve is at the end of its stroke to connect port $pv$ with atmospheric port $pa$, as has already been described, and suction valve cylinders 30, 31 will be relieved and the suction valves rendered effective. The compressor, therefore, will be operated to restore the pressure in the reservoir, first to minimum pressure value to operate the low pressure valve with its consequent results, and then to maximum pressure value to operate the high pressure value with its consequent results already described, this cycle of operations being repeated. The by-passes 108 serve also to prevent accumulation of pressure in passageway 105 and below piston 84 if at any time the high pressure valve should leak, the leakage air finding its way to atmosphere through the by-passes, through hollow piston rod 85 and out through the blow-out openings 110—111. Thus, any false operations of piston 84, and opening of the motor circuit, is prevented.

Having thus described my invention, I desire to secure the following claims by Letters Patent:

1. In a fluid pressure system, the combination of a compressor for supplying the system, an electric motor for driving the compressor, a resistance for the motor, a plurality of pneumatic mechanisms for controlling the connection of the resistance in circuit, master pneumatic means controlled by the pressure in the system to cause operation of the pneumatic mechanisms to gradually change the effect of the resistance to cause the motor to be gradually brought to full power, and additional pneumatic means also controlled by the master pneumatic mechanism for causing the compressor to be ineffective until the motor has assumed full power and to then cause the compressor to become effective to supply fluid under pressure to the system.

2. In a fluid pressure system, the combination of a compressor, a motor for driving the compressor, a resistance, a plurality of sub-pneumatic mechanisms associated with the resistance, and a master pneumatic mechanism controlled by the pressure of the system to cause operation of the sub-pneumatic mechanisms to cause connection of the resistance with the motor circuit to cause the motor to gradually assume full power, pneumatic mechanisms associated with the valves of the compressor and controlled by the pressure of the system to affect the valves to cause the compressor to be ineffective until the motor has reached full power, said valve pneumatic mechanisms being also controlled by the master pneumatic mechanism to affect the valves to cause the compressor to become effective after the motor has assumed full power.

3. In a motor compressor system, the combination of a compressor, a driving motor therefor, a resistance for the motor circuit, a plurality of sub-pneumatic mechanisms, each associated with a section of said resistance, a master pneumatic mechanism controlled by the pressure of the system to cause the sub-pneumatic mechanisms to be successively operated to associate the resistance sections successively with the motor circuit to cause the motor to gradually assume full power, and pneumatic means also controlled by the master pneumatic mechanisms for causing the compressor to be ineffective until the motor has assumed full power and for then causing the compressor to be effective to supply fluid under pressure to the system.

4. In a fluid pressure system, the combination of a compressor for supplying the system, a motor for driving the compressor, pneumatic mechanism associated with the compressor, governor valve mechanism operated when the pressure reaches a certain minimum value to connect the pneumatic mechanism with the system to cause the compressor mechanism to become effective to supply fluid to the system when driven by the motor, and additional governor valve mechanism operated when the pressure reaches a certain maximum value to connect the pneumatic mechanism with the system to cause the compressor mechanism to be rendered ineffective.

5. In a fluid pressure system, the combination of a compressor for supplying the system, a motor for driving the compressor, pneumatic mechanism controlling the effective operation of the compressor, valve mechanism controlling the connection of the pneumatic mechanism with the system, a piston for operating the valve mechanism, governor valve mechanism controlled by the pressure of the system for governing the pressure on the piston, said governor mechanism being operated when the pressure reaches a certain maximum value to control the pressure conditions on the piston to move the valve to cause connection of the pneumatic mechanism with the system to be operated to render the compressor ineffective, said governor mechanism being operated when the pressure falls to a certain minimum value to change the pressure conditions of the piston to cause actuation of the valve mechanism, thereby to connect the pneumatic mechanism with the system to cause operation thereof to render the compressor effective to restore the pressure.

6. In a fluid pressure system, the combination of a compressor for supplying the system, an electric motor for driving the compressor, a resistance for the motor, a plurality of pneumatic mechanisms for controlling the connection of the resistance with the circuit, a main valve controlled by the fluid in the system and controlling the connection of the pneumatic mechanisms with the fluid in the system, controlling valves for the compressor, pneumatic means associated with said valves and controlled by the main valve mechanism, said main valve mechanism being actuated when a minimum pressure in the system is reached to connect the pneumatic mechanisms for service and to disconnect the valve controlling pneumatic mechanism from service whereby the compressor is operated, said main valve mechanism being actuated when a maximum pressure in the system is reached to cause the pneumatic mechanisms to become inoperative, and the valve controlling mechanism to become operative, whereby said compressor is rendered ineffective.

7. In a fluid pressure system, the combination of a compressor for supplying the system, an electric motor for driving the compressor, a plurality of sub-pneumatic mechanisms, a resistance for the motor circuit controlled by said sub-pneumatic mechanisms, a main valve for controlling the operation of the sub-pneumatic mechanisms, controlling valves for the compressor, pneumatic means associated with said controlling valves and controlled by the main valve, said main valve being actuated when a minimum pressure in the system is reached to first connect the sub-pneumatic mechanisms for service to control the resistance to cause operation of the motor, and then to control the valve pneumatic mechanism to allow the controlling valves to become effective, the main valve being actuated when a maximum pressure in the system is reached to control the valve pneumatic mechanism to render the valves ineffective and to control the sub-pneumatic mechanisms to affect the resistance to stop the operation of the motor.

8. In a fluid pressure system, the combination of a compressor for supplying the system, an electric motor for driving the compressor, a resistance for the motor, a plurality of sub-pneumatic contact mechanisms connected with said resistance, a main valve, controlling valves for the compressor, pneumatic mechanism for controlling said valves connected with the main valve, maximum pressure in the system causing said main valve to be disposed to connect the sub-pneumatic mechanisms with atmosphere and said valve controlling pneumatic mechanism with the fluid under pressure in the system whereby said resistance is effective and the compressor valves ineffective, and maximum pressure in the system causing said main valve to be actuated to gradually connect the sub-pneumatic contact mechanisms with the fluid whereby the resistance is disconnected from the motor circuit and to finally connect the valve controlling pneumatic means with atmosphere whereby the compressor valves are rendered effective and the compressor operated to restore pressure to the system.

In witness whereof, I hereunto subscribe my name this 18th day of May A. D., 1907.

BERT AIKMAN.

Witnesses:
CHARLES J. SCHMIDT,
LEONARD W. NOVANDER.